(12) United States Patent
Unser et al.

(10) Patent No.: US 8,644,668 B2
(45) Date of Patent: Feb. 4, 2014

(54) DOCKING PORT OPTICAL COVER

(75) Inventors: Diana L. Unser, Lakewood, CO (US); Erica A. Stockford, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 353 days.

(21) Appl. No.: 12/838,587

(22) Filed: Jul. 19, 2010

(65) Prior Publication Data

US 2012/0014657 A1 Jan. 19, 2012

(51) Int. Cl.
*G02B 6/00* (2006.01)

(52) U.S. Cl.
USPC .......................................................... 385/139

(58) Field of Classification Search
USPC .......................................................... 385/139
See application file for complete search history.

(56) References Cited

U.S. PATENT DOCUMENTS 7,699,536 B2 * 4/2010 Yoshikawa et al. ............. 385/92
7,706,657 B1 * 4/2010 McQuiggan ................... 385/139

* cited by examiner

*Primary Examiner* — Eric Wong
(74) *Attorney, Agent, or Firm* — Swanson & Bratschun, L.L.C.

(57) ABSTRACT

According to the invention, a system for covering the docking port of an optical communication device and protecting a terminating end of an optical fiber at the optical communication device is disclosed. The system may include body, where the body is configured to be at least partially received by the docking port of the optical communication device. The body may also be configured at partially receive the optical fiber. The body may not allow communication between the optical fiber and the optical communication device.

13 Claims, 9 Drawing Sheets

DOCKING PORT OPTICAL COVER

BACKGROUND OF THE INVENTION

This invention relates generally to fiber optic systems. More specifically the invention relates to fiber optic cable management and termination systems.

Generally, optical fibers are run from a plurality of possible user locations to a central location managed by a telecommunication provider. At the central location, the optical fibers can be communicatively coupled with telecommunication equipment in a manner dependent on what services are to be delivered to the user location.

Optical fibers can be very sensitive to the environment as well as the manner in which they are handled and stored. Furthermore, even with careful handling in the cleanest of environments, the final destination for a terminating end of the optical fiber may not be known when the optical fiber is initially run. Thus, fibers are usually initially run to a first location, possibly a fiber distribution frame, where later they can be cross-connected from/to optical communication devices.

Patching of optical cables introduces another possible point of degradation of the signals traveling through the optic fibers. In the alternative, even if the fiber is run to the approximate final destination ahead of time, but not connected with an optical communication device, the optic fiber may be only loosely stored, subjecting it to unwanted physical stresses. In this example, it is possible the exact length of optic fiber may not be ideal to the true final destination, or for damage to occur to the terminating end of the optic cable prior to final installation in an optical communication device.

Embodiments of the invention provide solutions to these and other problems.

BRIEF DESCRIPTION OF THE INVENTION

In one embodiment, a system for covering the docking port of an optical communication device and protecting a terminating end of an optical fiber at the optical communication device is provided. The system may include a body. The body may be configured to be at least partially received by the docking port of the optical communication device. The body may also be configured to at least partially receive the optical fiber. The body may also not allow communication between the optical fiber and the optical communication device or come in contact with electrical components.

In another embodiment, a method for covering the docking port of an optical communication device and protecting a terminating end of an optical fiber at the optical communication device is provided. The method may include providing a body. The method may also include disposing, at least partially, the body within the optical communication device. The method may additionally include disposing, at least partially, the optical fiber within the body, where the optical fiber may not be in communication with the optical communication device or come in contact with electrical components.

In another embodiment, a method for communicatively coupling an optical fiber with an optical communication device is provided. The method may include removing an optical fiber from a body in which the optical fiber is at least partially disposed. The body may not come in contact with electrical components, and/or may not allow communication between the optical fiber and the optical communication device. The method may also include removing the body from the optical communication device. The method may additionally include disposing an optical communication module in the optical communication device. The method may further include disposing the optical fiber in the optical communication module, where the optical communication module allows communication between the optical fiber and the optical communication device.

BRIEF DESCRIPTION OF THE DRAWINGS

The present invention is described in conjunction with the appended figures:

FIG. 8b is a front view of FIG. 8a;

Figure 1:
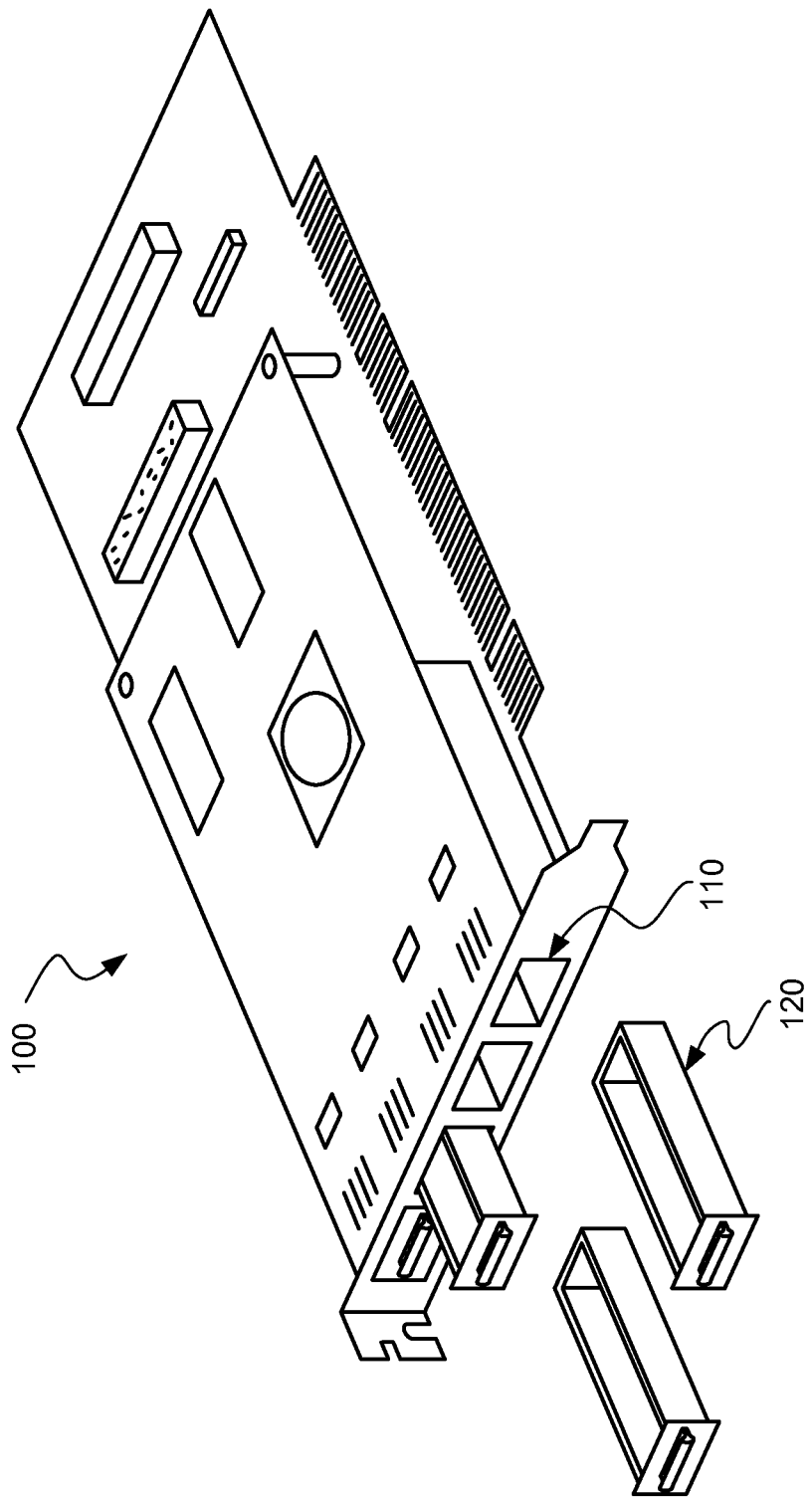
FIG. 1 is an axonometric view of a prior art optical communication device with blank modules.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

In one embodiment of the invention, a system for covering the docking port of an optical communication device and protecting a terminating end of an optical fiber at the optical communication device is provided. This system may be referred to as a storage module. The system may include a body. The body may be configured to be at least partially received by the docking port of the optical communication device. The body may also be configured to at least partially receive the optical fiber. The body may also not allow communication between the optical fiber and the optical communication device.

In some embodiments, the body may be held in place within the optical communication device via an interference fit or a spring device, for example a leaf spring on the exterior of the body. In some embodiments, the body may be at least partially made of a conductive material, especially those embodiments where the body does not contact electrical contacts in the optical communication device. In other embodiments, the body may be at least partially made of a non-conductive or insulating material, especially those embodiments where the body does contact electrical contacts in the optical communication device.

In some embodiments, the system may also include a handle. The handle may be coupled with the body. The handle may be configured to be moved between a first position and a second position. In the first position the handle may at least partially inhibit receipt of the optical fiber by the body. In the second position the handle may not inhibit receipt of the optical fiber by the body. The handle may, in some embodiments, be made from a metal wire, and may have a polymer sheath disposed around a portion of the metal wire.

In some embodiments, the body being configured to be at least partially received by the docking port of the optical communication device may include the body being at least partially insertable into the docking port of the optical communication device. In these or other embodiments, the body being configured to at least partially receive the optical fiber may include the optical fiber being at least partially insertable into the body.

In some embodiments, the body being configured to at least partially receive the optical fiber may include a cap disposed on the terminating end of the optical fiber, and the body being configured to at least partially receive the cap. In other embodiments, a cap-less optical fiber may be inserted into the body. In either embodiment, the optical fiber and/or optical fiber cap may be held in place within the body via an interference fit or a spring device, for example a leaf spring on the exterior of the body.

In some embodiments, the body not allowing communication between the optical fiber and the optical communication device may include the body not physically contacting an electrical terminal on the optical communication device.

In other embodiments, the body not allowing communication between the optical fiber and the optical communication device may include a non-conductive portion of the body physically contacting an electrical terminal on the optical communication device. Merely by way of example, a polymer portion of the body may contact the electrical terminal on the optical communication device, thereby preventing any shorting of terminals and/or protecting the terminals.

In another embodiment of the invention, a method for covering the docking port of an optical communication device and protecting a terminating end of an optical fiber at the optical communication device is provided. The method may include providing a body. The method may also include disposing, at least partially, the body within the optical communication device. The method may additionally include disposing, at least partially, the optical fiber within the body, where the optical fiber may not be in communication with the optical communication device.

In some embodiments, a cap may be disposed on the terminating end of the optical fiber. In these or other embodiments, disposing, at least partially, the optical fiber within the body may include disposing, as least partially, the cap within the body.

In another embodiment of the invention, a method for communicatively coupling an optical fiber with an optical communication device is provided. The method may include removing an optical fiber from a body in which the optical fiber is at least partially disposed. The body may not allow communication between the optical fiber and the optical communication device. The method may also include removing the body from the optical communication device. The method may additionally include disposing an optical communication module in the optical communication device. The method may further include disposing the optical fiber in the optical communication module, where the optical communication module allows communication between the optical fiber and the optical communication device.

In some embodiments, the method may also include removing a cap from a terminating end of the optical fiber, possibly after removal of the optical fiber from the body. In these or other embodiments, disposing the optical fiber in the optical communication module may include disposing the terminating end within the optical communication module.

In some embodiments, removing the body from the optical communication device may include moving a handle coupled with the body, and pulling the handle to remove the body from the optical communication device. This may be done after removal of the optical fiber from the body.

In some embodiments, the method may also include cleaning a terminal end of the optical fiber. This may be completed after the optical fiber has been removed from the body, and possibly after a cap has been removed from the terminating end of the optical fiber, but before the terminating end has been inserted into the optical communication module.

Turning now to FIG. 1, an axonometric view of optical communication device (OCD) 100 is shown. OCD 100 includes multiple docking ports 110. Each docking port 110 may initially be filled by a blank module 120. Blank modules 120 work to fill docking ports 110 and protect them until they are used.

Figure 2:
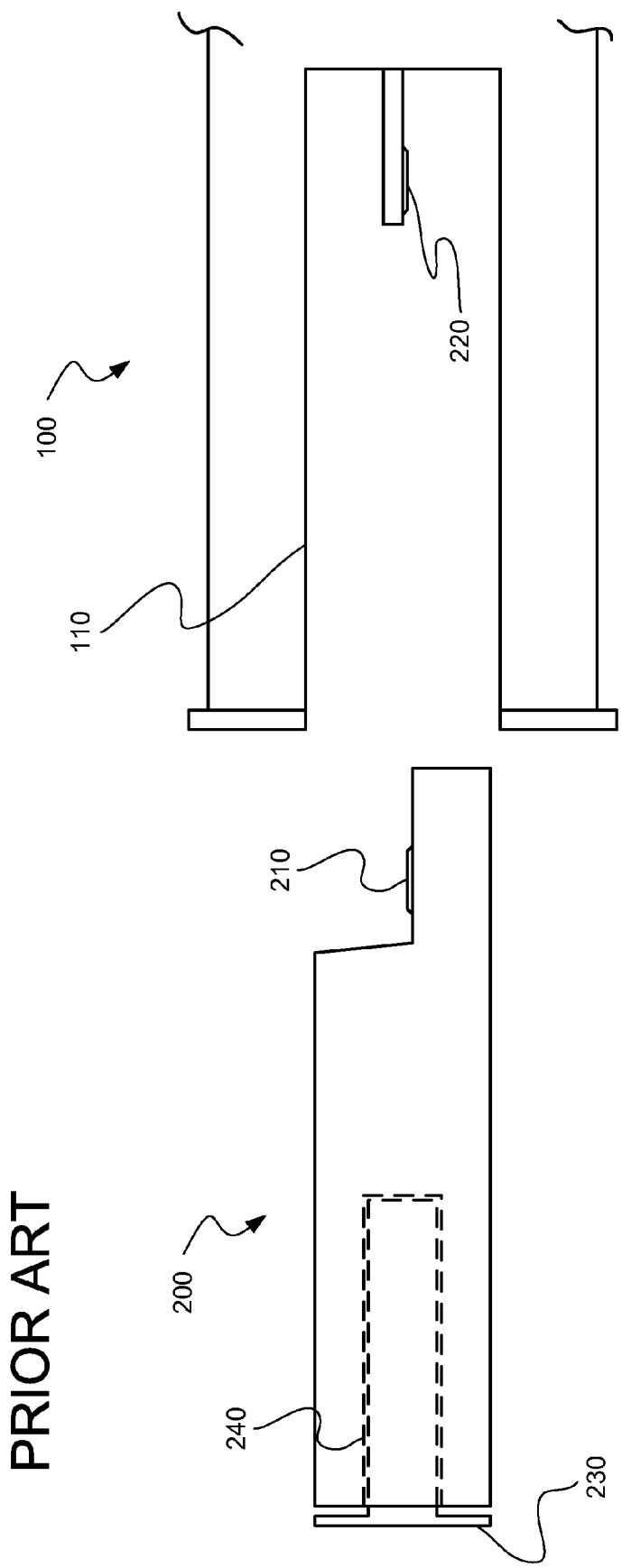
FIG. 2 is a generic side view of a docking port of an optical communication device and a optical communication module (prior art)

FIG. 2 shows a side view of a docking port 110 of OCD 100 and an optical communication module (OCM) 200. OCM 200 provides an interface for an optical fiber to communicate with OCD 100.

OCM 200 has electrical contacts 210 which transfer electronic communication between OCM 200 and OCD 100. Electrical contacts 210 on OCM 200 will interface with electrical contacts 220 on OCD 100, once OCM 200 is inserted into docking port 110 of OCD 100.

OCM 200 may initially be filled by a cap 230. Cap 230 may be removable from OCM 200, and work to fill and protect an optical fiber receptacle (OFR) 240 of OCM 200 until an optical fiber is received therein.

Figure 3:
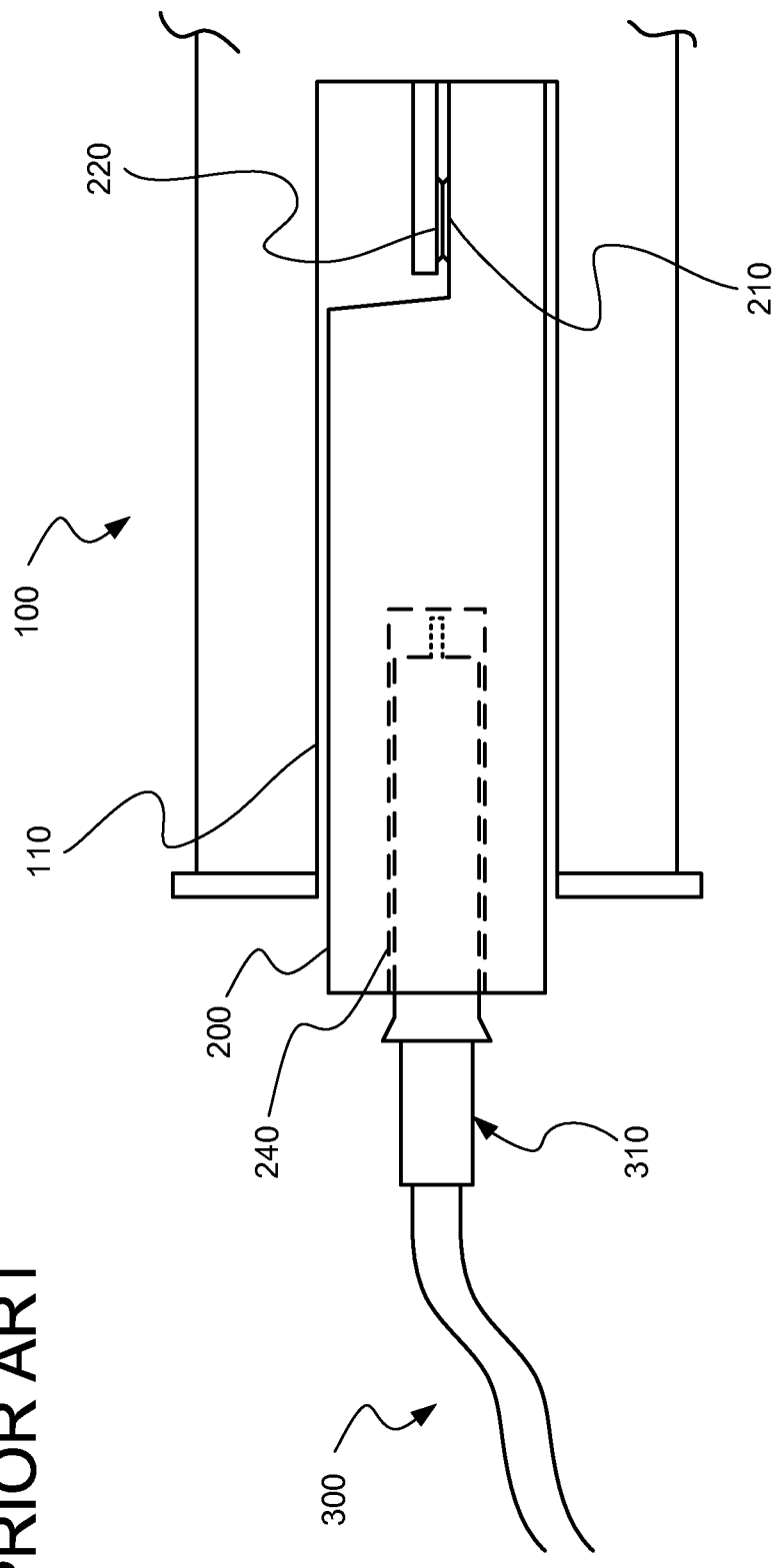
FIG. 3 is a generic side view of the optical communication device and optical communication module of FIG. 2, but with the module inserted into the docking port, and an optical fiber inserted into the module (prior at)

FIG. 3 shows a side view of the OCD 100 and OCM 200 of FIG. 2, but with OCM 200 inserted into docking port 110 of OCD 100, and an optical fiber 300 inserted into OFR 240 of OCM 200.

In this configuration, communications on optical fiber 300 will be received by OCM 200 via terminating end 310, processed by OCM 200, and conveyed with OCD 100 via electrical contacts 210, 220.

Figure 4:
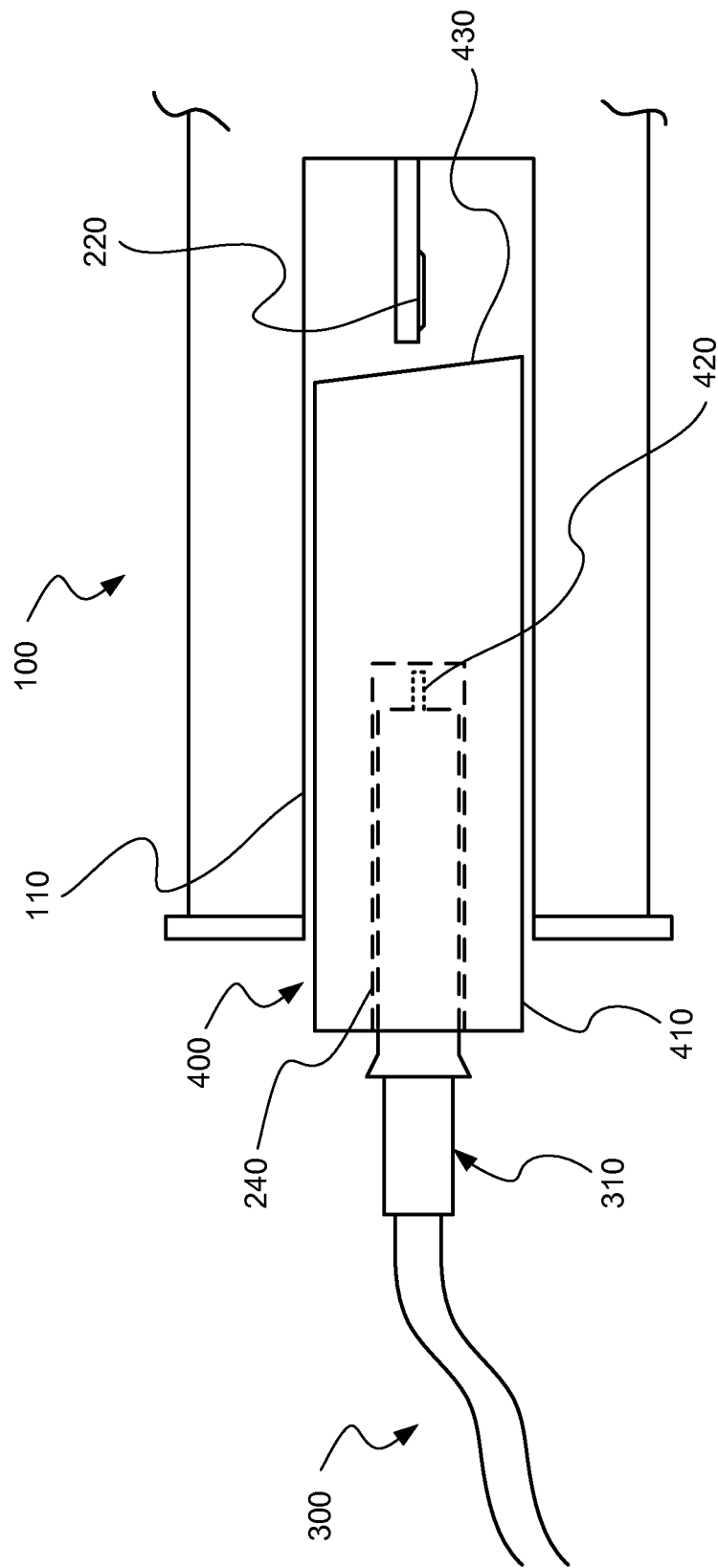
FIG. 4 is a representative side view of an embodiment of the invention for storing the terminating end of an optical fiber at the optical communication device.

FIG. 4 shows a side view of an embodiment of the invention for storing terminating end 310 of optical fiber 300 at OCD 100. In this embodiment, a storage module 400 has a body 410 which defines an OFR 240 into which at least a portion of the terminating end 310 of optical fiber 300 may be inserted.

Body 410 may protect terminating end 310 of optical fiber 300, and more specifically terminate the communication end 420 of optical fiber 400.

In this embodiment, body 410 may not couple with electrical contacts 220 of OCD 100 by having an end 430 that stops short of electrical contacts 220. In this manner, terminating end 310 of optical fiber 300 may be safely stored at OCD 100 but without being in communication with OCD 100.

In this embodiment, optical fiber 300 and/or its terminating end 310 need not be stored at a nearby fiber distribution frame or other storage area. This in turn preempts the need for a patch cable between the fiber docking frame or other storage area to OCD 100. This is advantageous because a patch cable adds additional points of possible degradation or early-unwanted-termination of the signal on optical fiber 300.

In these embodiments then, storage module 400 may merely be replaced by an OCM 200 when service is desired to optical fiber 300. Different OCM's 200, as well as different OCD's 100, may be employed depending on the services requested for the optical fiber and/or other parameters of the communications system. Merely by way of example, different OCM's 200 which may be employed include small form-factor pluggable (SFP), 10 Gigabit Small Form Factor Pluggable (XFP), C form-factor pluggable (CFP), etc.

Figure 5:
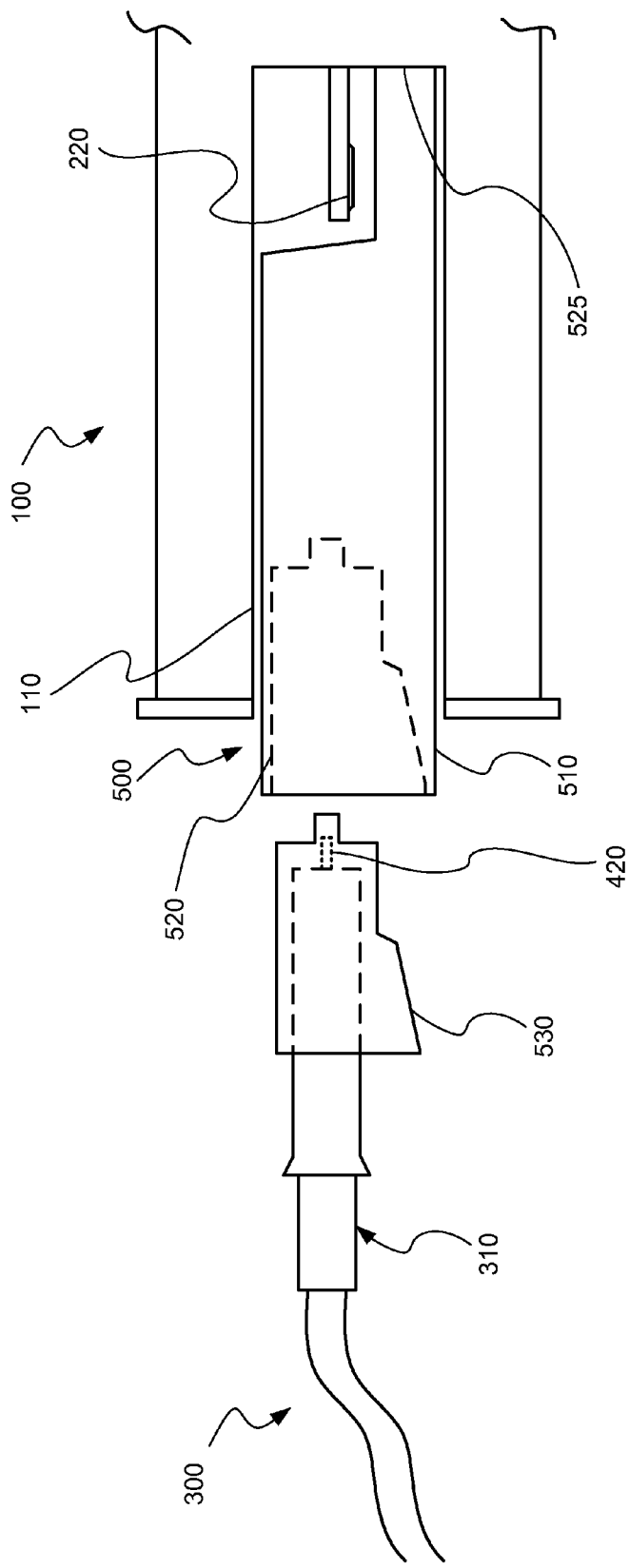
FIG. 5 is a representative side view of another embodiment of the invention for storing the terminating end of an optical fiber at the optical communication device.

FIG. 5 shows a side view of another embodiment of the invention for storing the terminating end 310 of an optical fiber 300 at the OCD 100. In this embodiment, storage module 500 has a body 510 which defines an OFR 520 into which at least a portion of a capped 530 terminating end 310 of optical fiber 300 may be inserted. Note that in this embodiment, body 510 may have an end 525 which seats to the deepest portion of docking port 110, but which still does not couple with electrical contacts 220.

In this manner, an optical fiber 300 having cap initially disposed over terminating end 310 may be inserted into storage module 500 without removal of cap 530. This may at least partially assist in keeping communication end 420 free from dirt or debris accumulation or damage.

Figure 6:
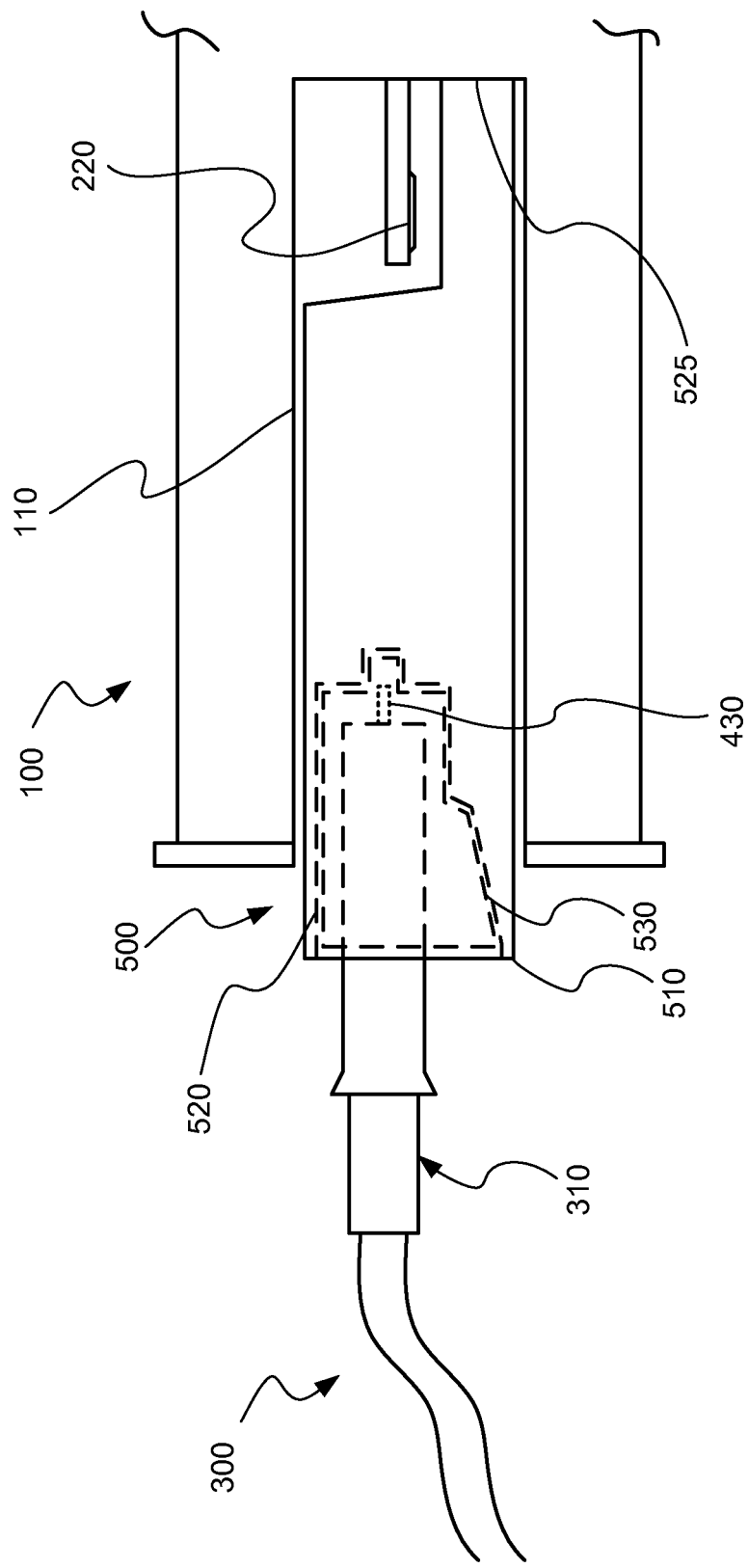
FIG. 6 is a representative side view of the embodiment shown in FIG. 5, but with the optical fiber inserted into the storage module.

FIG. 6 shows a side view of the embodiment shown in FIG. 5, but with the optical fiber 300 with cap 530 inserted into the storage module. In an alternative embodiment, cap 530 may partial extend outward from OFR 520, thereby allowing a user to withdraw optical fiber 300 from storage module 500 by grasping and pulling on cap 530 rather than optical fiber 300.

Figure 7:
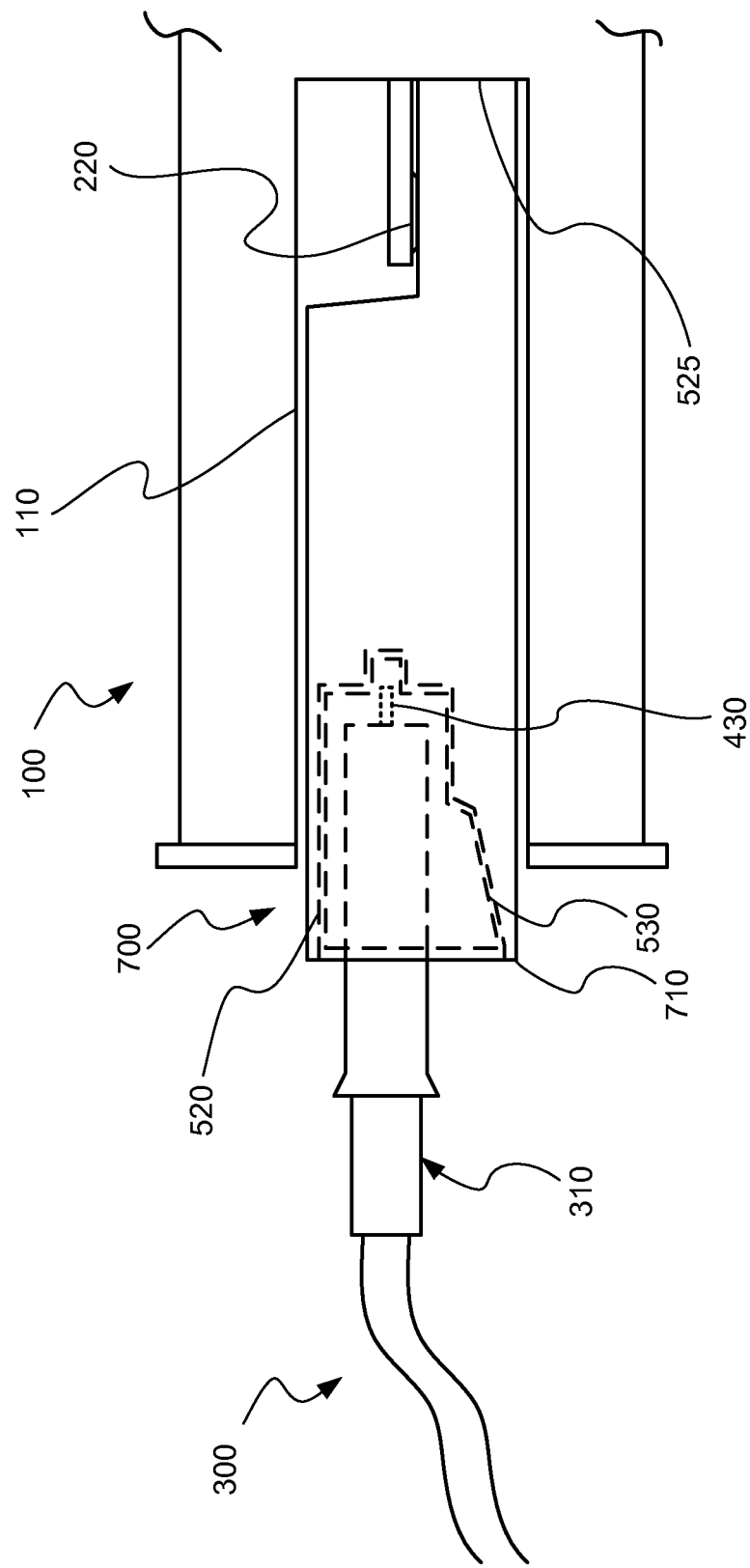
FIG. 7 is a representative side view of an another embodiment of the invention for storing the terminating end of an optical fiber at the optical communication device.

FIG. 7 shows a side view of an another embodiment of the invention for storing the terminating end 310 of an optical fiber 300 at the OCD 100. In this alternative embodiment, storage module 700 has a body 710 which has at least partial contact with electrical contacts 220 of OCD 100. In this embodiment, body 710, or at least the portion of body 710 in contact with electrical contacts 220, may be non-conductive. This may at least partially assist in also protecting electrical contacts 220 of OCD 100 in addition to optical fiber 300.

Figure 8B:
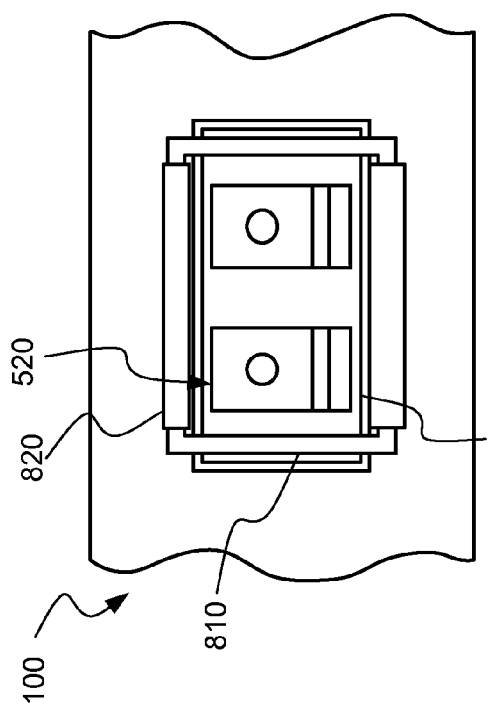
Figure 8D:
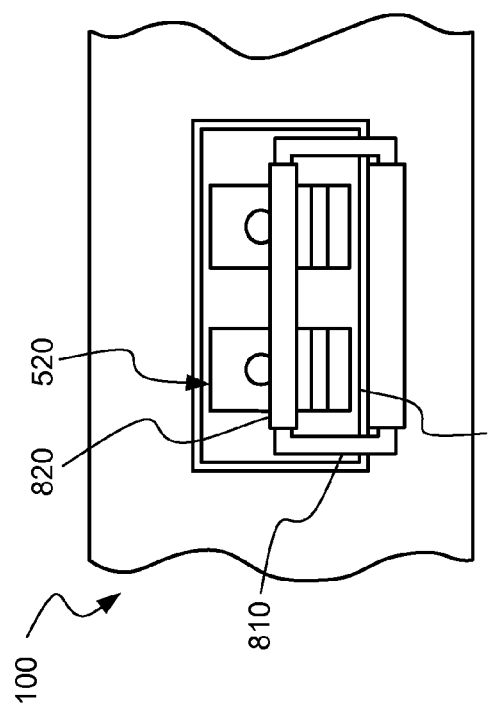
FIG. 8d is a front view of FIG. 8c.
Figure 8A:
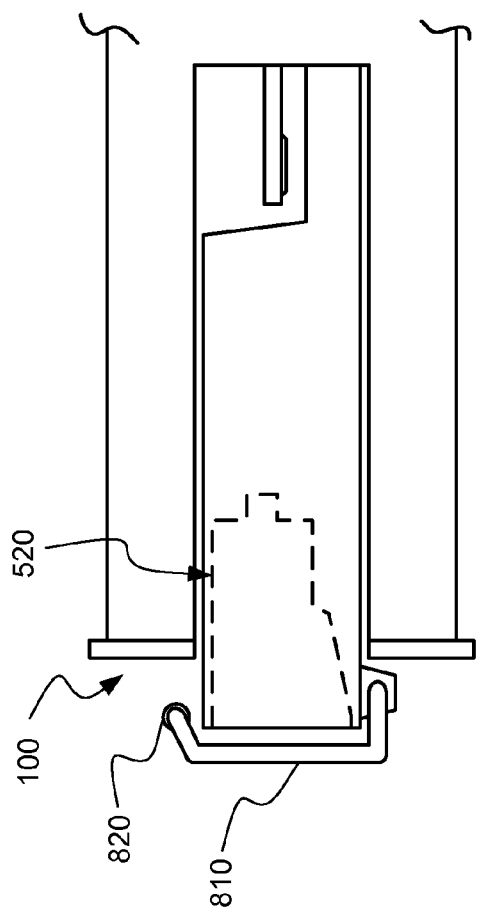
FIG. 8a is a representative side view of another embodiment of the invention for storing the terminating end of an optical fiber at the optical communication device, but also having a handle on the storage module.

FIG. 8*a* shows a side view of another embodiment of the invention for storing the terminating end 310 of an optical fiber 300 at the OCD 100, but also having a handle 810 on the storage module. FIG. 8*b* shows a front view of FIG. 8*a*. In FIGS. 8*a* and 8*b*, the handle is in the stored position, with the two OFR's 520 in storage module 500 being operable to accept optical fibers 300.

Figure 8C:
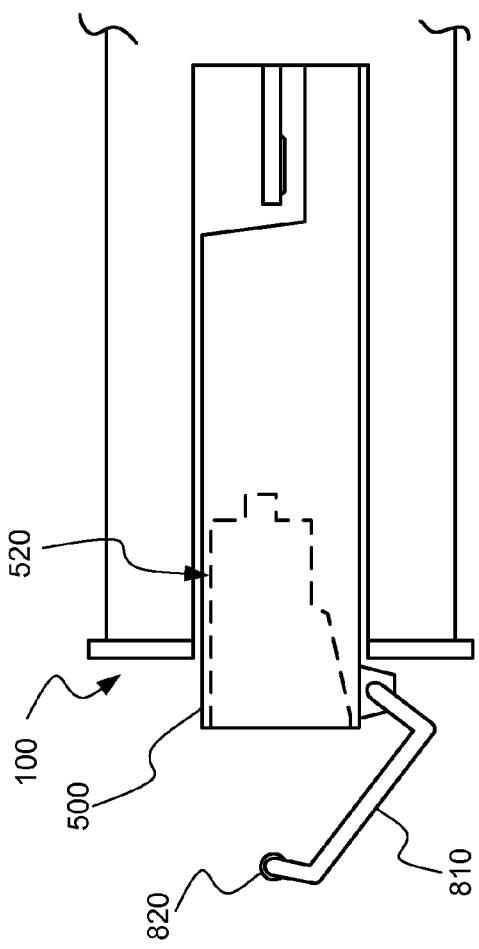
FIG. 8c is a representative side view of the embodiment of FIG. 8a, except where the handle is in a different position.

FIG. 8*c* shows a side view of the embodiment of FIGS. 8*a* and 8*b*, except where the handle is in a different position. FIG. 8*d* shows a front view of FIG. 8*c*. In this position, handle 810 is in the position operable to remove storage module 500 from OCD 100. In this position, handle 810 may at least partially impair insertion of optical fiber 300 into storage module 500.

As also shown in FIGS. 8*a*-8*d*, in some embodiments handle 810 may also include a handle guard 820. Handle guard 820 may be made from a polymer or other material and may also be colored. The coloring of handle guard 820 may be specific and common for all storage modules 500 (or at least storage modules 500 of a certain type), as opposed to a different coloring scheme used for handle guards on the handles of different possible OCM's 200. The different color of handle guard 820, versus the colors of handle guards on OCM's 200, may visually indicate the presence of storage module 500 to a user. Merely by way of example, OCM's 200 may have red, blue, and green handle guards, while handle guard 820 may be black. In this example, a user looking an optical communication device 100 could determine from a quick glance which of docking ports 110 has an OCM 200, and which has a storage module 500, based on the color of the handle guards on each. In other embodiments, no handle guard 820 may exist on storage module 500, possibly indicating the storage module's 500 presence vis-à-vis OCM's 200 which do have handle guards.

Figure 9:
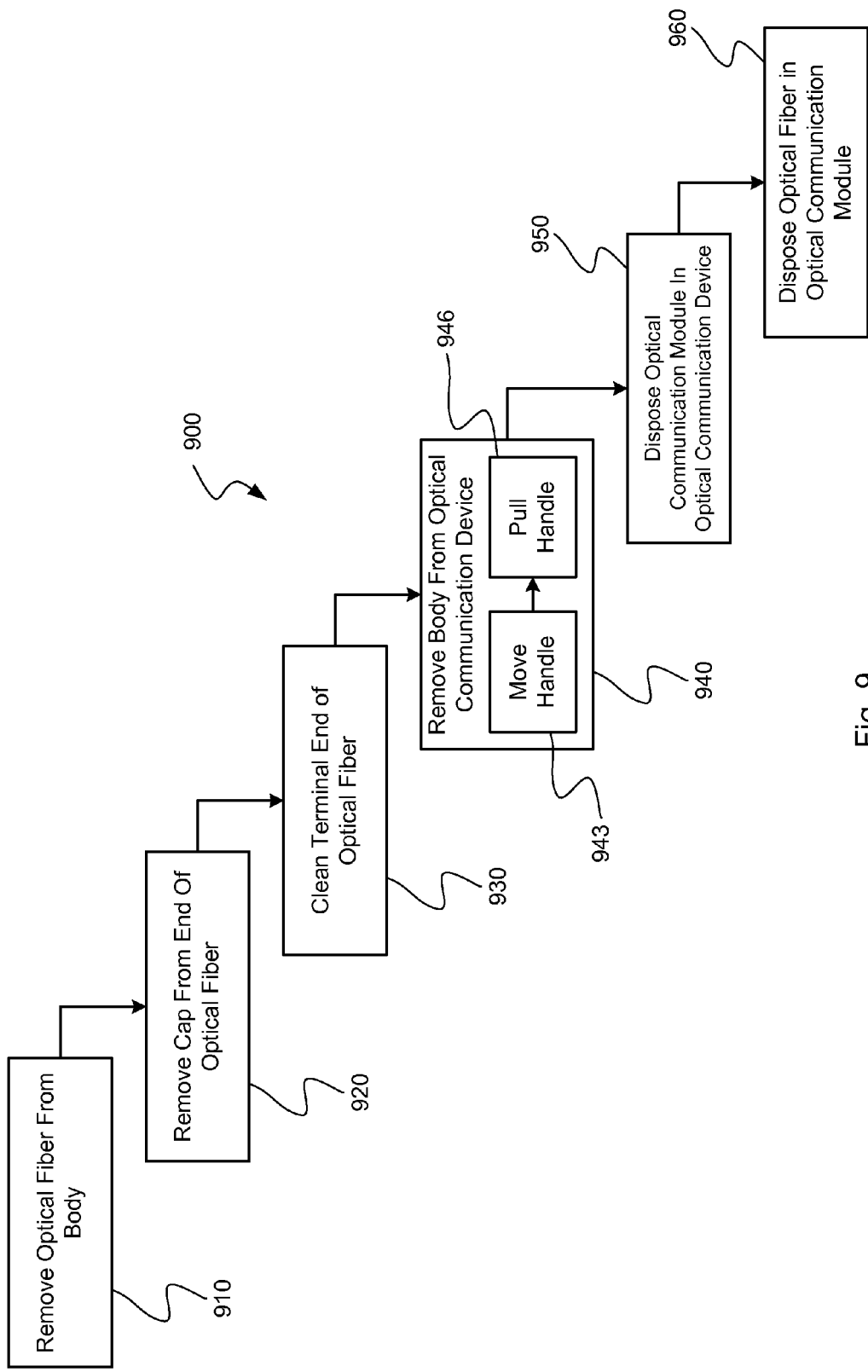
FIG. 9 is a block diagram of a method of the invention for communicatively coupling an optical fiber with an optical communication device where the capped optical fiber is stored at the optical communication device via a storage module.

FIG. 9 shows a block diagram of a method 900 of the invention for communicatively coupling an optical fiber with an optical communication device where the optical fiber is stored a the optical communication device via a storage module.

At block 910, the optical fiber may be removed from the body of the storage module. At block 920, in embodiments where the storage module holds a capped optical fiber, the cap is removed from the terminating end of the optical fiber. At block 930, the terminating end of the optical fiber may be cleaned.

At block 940, the storage module may be removed from the optical communication device. In some embodiments, this may be accomplished by the handle of the storage module being moved at block 943, and at block 946, the handle may be pulled, thereby pulling the storage module out of the optical communication device.

At block 950, an optical communication module may be disposed in the optical communication device. At block, 960 the optical fiber may be disposed in the optical communication module, thereby completing the communicative connection of the optical fiber with the optical communication device.

The invention has now been described in detail for the purposes of clarity and understanding. However, it will be appreciated that certain changes and modifications may be practiced within the scope of the appended claims.

What is claimed is:

1. A system for covering the docking port of an optical communication device and protecting a terminating end of an optical fiber at the optical communication device, wherein the system comprises:
   a body comprising an end portion, an inner portion, and a non-conductive portion, wherein:
      the end portion includes a first shape that allows the body to be at least partially received by the docking port of the optical communication device, the end portion having a flat face, wherein, when the body is at least partially received by the docking port, an entire surface of the flat face of the end portion makes physical contact with a deepest portion of the docking port of the optical communication device;
      the inner portion includes a second shape that allows the body to at least partially receive the optical fiber; and
      the non-conductive portion is interposed between the body and an electrical terminal within the docking port to prevent communication between the optical fiber and the optical communication device.

2. The system for covering the docking port of an optical communication device and protecting a terminating end of an optical fiber at the optical communication device of claim 1, wherein the first shape of the end portion that allows the body to be at least partially received by the docking port includes a third shape that allows the body to be at least partially insertable into the docking port of the optical communication device.

3. The system for covering the docking port of an optical communication device and protecting a terminating end of an optical fiber at the optical communication device of claim 1, wherein the second shape of the inner portion that allows the body to at least partially receive the optical fiber includes a fourth shape that allows the optical fiber to be at least partially insertable into the body.

4. The system for covering the docking port of an optical communication device and protecting a terminating end of an optical fiber at the optical communication device of claim 1, wherein the second shape of the inner portion that allows the body to at least partially receive the optical fiber comprises:
   a fifth shape that generally conforms to an outer shape of a cap disposed on the terminating end of the optical fiber, wherein the fifth shape allows the body to at least partially receive the cap.

5. The system for covering the docking port of an optical communication device and protecting a terminating end of an optical fiber at the optical communication device of claim 1, wherein the non-conductive portion of the body does not physically contact the electrical terminal within the docking port of the optical communication device.

6. The system for covering the docking port of an optical communication device and protecting a terminating end of an optical fiber at the optical communication device of claim 1, wherein the non-conductive portion of the body physically contacts the electrical terminal within the docking port of the optical communication device.

7. The system for covering the docking port of an optical communication device and protecting a terminating end of an optical fiber at the optical communication device of claim 1, wherein the system further comprises:
   a handle, wherein:
      the handle is coupled with the body; and
      the handle includes a portion having a sixth shape that allows the handle to be moved between a first position and a second position, wherein:
         in the first position the handle at least partially inhibits receipt of the optical fiber by the body; and
         in the second position the handle does not inhibit receipt or extraction of the optical fiber by the body.

8. A method for covering a docking port of an optical communication device and protecting a terminating end of an optical fiber at the optical communication device, wherein the method comprises:
   providing a body comprising an end portion having a flat face;
   disposing, at least partially, the body within the docking port of the optical communication device, such that an entire surface of the flat face of the end portion of the body makes physical contact with a deepest portion of the docking port of the optical communication device; and
   disposing, at least partially, the optical fiber within the body, wherein the optical fiber is not in communication with the optical communication device.

9. The method for covering the docking port of an optical communication device and protecting a terminating end of an optical fiber at the optical communication device of claim 8, wherein a cap is disposed on the terminating end of the optical fiber, and disposing, at least partially, the optical fiber within the body comprises disposing, at least partially, the cap within the body.

10. A method for communicatively coupling an optical fiber with an optical communication device, wherein the method comprises:
   removing an optical fiber from a body in which the optical fiber is at least partially disposed, wherein the body comprises an end portion having a flat face, an entire surface of which makes contact with a deepest portion of a docking port of the optical communication device, and wherein the body does not allow communication between the optical fiber and the optical communication device;
   removing the body from the docking port of the optical communication device;
   disposing an optical communication module in the docking port of the optical communication device; and
   disposing the optical fiber in the optical communication module, wherein the optical communication module allows communication between the optical fiber and the optical communication device.

11. The method for communicatively coupling an optical fiber with an optical communication device of claim 10, wherein the method further comprises removing a cap from a terminating end of the optical fiber, and wherein disposing the optical fiber in the optical communication module comprises disposing the terminating end within the optical communication module.

12. The method for communicatively coupling an optical fiber with an optical communication device of claim 10, wherein removing the body from the optical communication device comprises:

moving a handle coupled with the body; and
pulling the handle to remove the body from the optical communication device.

13. The method for communicatively coupling an optical fiber with an optical communication device of claim 10, wherein the method further comprises cleaning a terminal end of the optical fiber.

\* \* \* \* \*